United States Patent
Frye et al.

(10) Patent No.: US 10,181,943 B2
(45) Date of Patent: Jan. 15, 2019

(54) DISTRIBUTING COHERENT SIGNALS TO LARGE ELECTRICAL DISTANCES OVER SERIAL INTERCONNECTIONS

(71) Applicant: Blue Danube Systems, Inc., Warren, NJ (US)

(72) Inventors: Robert C. Frye, Piscataway, NJ (US); Mihai Banu, New Providence, NJ (US)

(73) Assignee: Blue Danube Systems, Inc., Warren, NJ (US)

( * ) Notice: Subject to any disclaimer, the term of this patent is extended or adjusted under 35 U.S.C. 154(b) by 0 days.

(21) Appl. No.: 15/486,675

(22) Filed: Apr. 13, 2017

(65) Prior Publication Data

US 2018/0091292 A1    Mar. 29, 2018

Related U.S. Application Data

(60) Provisional application No. 62/401,501, filed on Sep. 29, 2016.

(51) Int. Cl.
*G01S 7/40* (2006.01)
*H01Q 3/00* (2006.01)
(Continued)

(52) U.S. Cl.
CPC ............ *H04L 7/04* (2013.01); *H01Q 3/00* (2013.01); *H04B 1/18* (2013.01); *H04B 17/00* (2013.01);
(Continued)

(58) Field of Classification Search
CPC .................................. H04L 7/04; H04L 7/033
See application file for complete search history.

(56) References Cited

U.S. PATENT DOCUMENTS 3,229,204 A    1/1966 Poehlman
5,412,414 A    5/1995 Ast et al.
(Continued)

FOREIGN PATENT DOCUMENTS

EP    1295417    3/2003
EP    2 372 836    10/2011

OTHER PUBLICATIONS

U.S. Appl. No. 15/448,744, Banu et al., filed Mar. 3, 2017.

*Primary Examiner* — Shuwang Liu
*Assistant Examiner* — Gina M McKie
(74) *Attorney, Agent, or Firm* — Occhiuti & Rohlicek LLP

(57) ABSTRACT

A method involving a serial interconnection system having a first node, a second node, a plurality of calibration nodes that are electrically connected in series by the serial interconnection system, and a plurality of connection nodes corresponding to the plurality of serially connected calibration nodes and electrically connected in series by the serial interconnection system, the method involving: for each of the plurality of calibration nodes performing a measurement procedure involving: injecting a corresponding reference signal into that calibration node; and while the corresponding reference signal is being injected into that calibration node, determining a summation of the phases of signals appearing at the first and second nodes; from the determined phase summations for the plurality of calibration nodes, computing phase corrections for each of the plurality of calibration nodes; and applying the phase corrections to the corresponding plurality of connection nodes.

36 Claims, 9 Drawing Sheets

(51) Int. Cl.
    *H04B 1/18*      (2006.01)
    *H04L 1/24*      (2006.01)
    *H04L 7/04*      (2006.01)
    *H04B 17/00*     (2015.01)
    *H04L 12/40*     (2006.01)

(52) U.S. Cl.
    CPC ........ *H04L 1/242* (2013.01); *G01S 2007/406* (2013.01); *H04L 12/40052* (2013.01)

(56)              References Cited

U.S. PATENT DOCUMENTS

| | | |
|---|---|---|
| 6,157,343 A | 12/2000 | Andersson et al. |
| 7,466,252 B1 * | 12/2008 | Radulov ............. H03M 1/1061 |
| | | 341/120 |
| 8,013,783 B2 | 9/2011 | Lomes et al. |
| 8,259,884 B2 | 9/2012 | Banu et al. |
| 8,611,959 B2 | 12/2013 | Banu et al. |
| 8,665,141 B2 | 3/2014 | Malmqvist et al. |
| 9,391,565 B2 | 7/2016 | Scott et al. |
| 9,444,559 B2 | 9/2016 | Jiang et al. |
| 2011/0001660 A1 * | 1/2011 | Ray ....................... H01Q 3/267 |
| | | 342/174 |
| 2017/0078081 A1 | 3/2017 | Bann et al. |
| 2017/0180110 A1 | 6/2017 | Banu |

* cited by examiner

DISTRIBUTING COHERENT SIGNALS TO LARGE ELECTRICAL DISTANCES OVER SERIAL INTERCONNECTIONS

CROSS-REFERENCE TO RELATED APPLICATIONS

This application claims the benefit under 35 U.S.C. 119(e) of U.S. Provisional Application No. 62/401,501, filed Sep. 29, 2016, all of which is incorporated herein by reference.

TECHNICAL FIELD

Embodiments of the present invention generally relate to signal distribution networks, which may be used in applications such as Local Oscillator (LO) distribution for analog phased arrays, sampling clock distribution for digital phased arrays, clock distribution for digital integrated circuits, or clock distribution for large circuit boards.

BACKGROUND

A serial interconnection between separate system modules provides the simplest communication network between these modules. Due to its simplicity, this type of network is useful in practice for cost and reliability reasons. In general, a system module can be any subsystem, as simple as a single passive component or as complicated as a Phased-Locked Loop (PLL), an entire radio, an antenna phased array, or some other complex circuit. A serial interconnection uses a transmission medium with unidimensional signal propagation properties such as an electrical cable, an optical fiber, a strip line, a microstrip line, a coplanar line, a wireless narrow beam, etc. The system modules connected serially attach to this transmission medium and receive or transmit signals, usually according to a protocol. For example, a simple protocol involves distributing a signal from one module to all other modules. A more sophisticated protocol might involve both transmitting and receiving signals from one module to any other module or set of modules.

In many applications, it is important to know precisely the time delay a signal undergoes when propagating over the serial interconnection from one module to another module. For example, if we distribute serially an LO (local oscillator) or a sampling signal over a phased array containing many radio modules, it is important to correct the phase differences between the signals received at each radio module due to propagating delays. Without this correction, also referred to as "phase calibration", the proper functionality of the phased array would be compromised since the very operation of a phased array relies on precise global phase alignment of signals at all radios.

Similarly, in some applications not only time delays or phase shifts but also signal magnitude changes due to transmission loses or other effects must be corrected. For example, the Intermediate Frequency (IF) lines in the active arrays described in U.S. Pat. No. 8,611,959, filed Dec. 17, 2013, all of which is incorporated herein by reference, have practical losses in addition to phase shifts. These losses need to be compensated for correct system operation. The magnitude correction is also called "magnitude calibration".

In production samples, time delays producing phase shifts and magnitude changes due to signal transport over a serial interconnection can be calculated or directly measured. However, such methods can be used for phase/magnitude calibration only if the physical implementation of the serial interconnection has transmission properties which are predictable to the desired precision after manufacturing and do not vary unpredictably over expected changes in operating conditions, such as temperature and humidity. If, for example, the transmission properties of the serial interconnection are subject to manufacturing variations beyond the desired precision, any pre-production calculations and simulations or any direct measurements of production samples cannot represent correctly the transmission properties of all units produced.

Likewise, even if all production units have predictable transmission properties at factory temperature and humidity conditions, these properties might vary unpredictably beyond the desired precision with field operating conditions. In such cases, the methods described above for identifying time delays and magnitude changes of serial interconnects cannot be used to compensate correctly the time delays and magnitude changes in the field.

When phase/magnitude calibration of a serial interconnection is required, the usual practice is to fabricate the serial interconnection with materials and design techniques ensuring predictable characteristics over manufacturing and operating conditions. This comes with a significant cost penalty in most cases. Take, for example, a phased array, which is a large electrical system, i.e., a system with physical dimensions, which are large compared to the wavelength of the operating frequency. If high frequency signals such as LO (local oscillator) signals propagate through the phased array over a serial interconnection, very large phase skews occur (e.g., thousands of degrees) yet the compensation of these skews (phase calibration) must reduce them to only a few degrees. This cannot be accomplished unless the natural skews are predictable to this level of precision. In order to fabricate transmission lines with such accurate characteristics, expensive materials (e.g. dielectrics, etc.) and high fabrication tolerances (e.g. line widths, thicknesses, etc.) are required.

A low-cost method for designing serial interconnections with inherent phase calibration is described in U.S. Pat. No. 8,259,884, filed Jul. 21, 2008, all of which is incorporated herein by reference. Other approaches to the same effect are also described in prior art identified in U.S. Pat. No. 8,259,884. In these methods, rather than relying on expensive materials and fabrication tolerances, the design relies on mutual compensation between signals propagating over matched transmission lines. These methods further rely on various high precision analog circuits. In practice, these analog circuits are challenging to design and are difficult to scale or port from one implementation to another because they require operation at high speed and with high precision simultaneously.

SUMMARY

Here we describe new methods for distributing coherent signals to large electrical distances over serial interconnections which are calibrated in phase and magnitude without relying on predictable transmission characteristics of the respective serial interconnections. Unlike most prior art methods, these new methods are also naturally fit for implementation with low-cost, scalable and portable digital circuits in lieu of analog circuits. Furthermore, some of the new methods do not rely on matched transmission lines.

For clarity and simplicity, the new concepts are introduced and described using continuous wave (CW) signals, i.e., signals containing a single frequency or tone. However, these concepts are valid for more complex signals such as modulated bandpass signals used in communication systems. For example, a phase calibration at one particular frequency is usually valid over a range of frequencies close to the calibrating frequency.

In general, in one aspect, the invention features a method involving a serial interconnection system having a first node, a second node, a plurality of calibration nodes that are electrically connected in series by the serial interconnection system, and a plurality of connection nodes corresponding to the plurality of serially connected calibration nodes, the plurality of connection nodes electrically connected in series by the serial interconnection system. The method involves: for each of the plurality of calibration nodes performing a measurement procedure involving: injecting a corresponding reference signal into that calibration node; and while the corresponding reference signal is being injected into that calibration node, determining a summation of the phases of signals appearing at the first and second nodes; from the determined phase summations for the plurality of calibration nodes, computing phase corrections for each of the plurality of calibration nodes; and applying the phase corrections computed for each of the plurality of calibration nodes to the corresponding plurality of connection nodes.

In general, in another aspect, the invention features a method involving: for each of the plurality of calibration nodes performing a measurement procedure involving: injecting a corresponding reference signal into that calibration node; and while the corresponding reference signal is being injected into that calibration node, determining a product of the magnitudes of the signals appearing at the first and second nodes; from the determined magnitude products for the plurality of calibration nodes, computing magnitude corrections for each of the plurality of calibration nodes; and applying the magnitude corrections computed for each of the plurality of calibration nodes to the corresponding plurality of connection nodes.

Other embodiments include one or more of the following features. The method also includes: injecting a first reference signal into the first node; while the first reference signal is being injected into the first node, determining a summation of the phases of that injected first reference signal into the first node and a signal appearing at the second node; wherein computing phase corrections for each of the plurality of calibration nodes also employs the determined phase summation for the first node. For each of the plurality of calibration nodes, the measurement procedure also involves while the corresponding reference signal is being injected into that calibration node, determining a product of the magnitudes of the signals appearing at the first and second nodes, and the method further involves: from the determined magnitude products for the plurality of calibration nodes, computing magnitude corrections for each of the plurality of calibration nodes; and applying the magnitude corrections computed for each of the plurality of calibration nodes to the corresponding plurality of connection nodes. The method further includes: injecting a first reference signal into the first node; while the first reference signal is being injected into the first node, determining a summation of the phases and a product of the magnitudes of that injected first reference signal and a signal appearing at the second node; wherein computing phase and magnitude corrections for each of the plurality of calibration nodes also employs the determined phase summation and the determined magnitude product for the first node.

Still other embodiments include one or more of the following features. While performing the measurement procedure for any one of the plurality of calibration nodes, applying no other reference signals to any of the other calibration nodes among the plurality of calibration nodes. The plurality of connection nodes is the same as the plurality of calibration nodes. The corresponding reference signals for the plurality of calibration nodes have the same frequency. The serial interconnection system also includes an input node, and the method further involves: injecting a first reference signal into the input node and the first node; while the first reference signal is being injected into the input node and the first node, determining a summation of the phases of that injected first reference signal at the input node and a signal appearing at the second node, wherein computing phase corrections for each of the plurality of calibration nodes also employs the determined phase summation for the input node. The serial interconnection system also includes an input node, and the method further involves: injecting a first reference signal into the input node and the first node; while the first reference signal is being injected into the input node and the first node, determining a summation of the phases and a product of the magnitudes of that injected first reference signal at the input node and a signal appearing at the second node, wherein computing phase and magnitude corrections for each of the plurality of calibration nodes also employs the determined phase summation and the determined magnitude product for the input node.

In general, in still yet another aspect, the invention features an apparatus including: a serial interconnection system having a first node, a second node, a plurality of calibration nodes that are electrically connected in series by the serial interconnection system, and a plurality of connection nodes corresponding to the plurality of serially connected calibration nodes, the plurality of connection nodes electrically connected in series by the serial interconnection system; a phase detector electrically connected to the first and second nodes of the serial interconnection system for determining a summation of the phases of signals sensed at the first and second nodes; a plurality of switchably controlled signal sources, each switchably controlled signal source connected to a different corresponding one of the plurality of calibration nodes; and a controller system. The controller system is programmed to perform the functions of: for each of the plurality of calibration nodes, performing a measurement procedure involving: causing the switchably controlled signal source for that calibration node to inject a corresponding reference signal into that calibration node; and while the corresponding reference signal is being injected into that calibration node, causing the phase detector to determine a summation of the phases of signals appearing at the first and second nodes; from the determined phase summations for the plurality of calibration nodes, computing phase corrections for each of the plurality of calibration nodes; and applying the phase corrections computed for each of the plurality of calibration nodes to the corresponding plurality of connection nodes.

In general, in another aspect, the invention features an apparatus including: a serial interconnection system having a first node, a second node, a plurality of calibration nodes that are electrically connected in series by the serial interconnection system, and a plurality of connection nodes corresponding to the plurality of serially connected calibration nodes, the plurality of connection nodes also electrically connected in series by the serial interconnection system; a phase detector electrically connected to the first and second nodes of the serial interconnection system for determining a summation of the phases of signals sensed at the first and second nodes; a plurality of switches for switchably electrically connecting each connection node among the plurality of connection nodes to a corresponding different calibration node among the plurality of calibration nodes; and a controller system. The controller system is programmed to perform the functions of: for each of the plurality of calibration nodes, performing a measurement procedure involving: causing the switch for that calibration node to inject a corresponding reference signal from the corresponding connection node into that calibration node; and while the corresponding reference signal is being injected into that calibration node, causing the phase detector to determine a summation of the phases of signals appearing at the first and second nodes; from the measured phase summations for the plurality of calibration nodes, computing phase corrections for each of the plurality of calibration nodes; and applying the phase corrections computed for each of the plurality of calibration nodes to the corresponding plurality of connection nodes.

Other embodiments include one or more of the following features. The apparatus further includes: a switchably controlled first signal source connected to the first node; and wherein the controller system is further programmed to perform the functions of: causing the switchably controlled first signal source to inject a first reference signal into the first node; while the first reference signal is being injected into the first node, causing the phase detector to determine a summation of the phases of that injected first reference signal and a signal appearing at the second node, wherein computing phase corrections for each of the plurality of calibration nodes also employs the determined phase summation for the first node. The apparatus further includes a first switch for switchably electrically connecting the input node to the first node, and wherein the controller system is further programmed to perform the functions of: causing the first switch to inject a signal into the first node from the input node; while the signal is being injected into the first node from the input node, causing the phase detector to determine a summation of the phases of that signal injected into the first node from the input node and a signal appearing at the second node, wherein computing phase corrections for each of the plurality of calibration nodes also employs the determined phase summation for the input node. The controller system is further programmed to cause the switchably controlled signal sources for the plurality of calibration nodes to inject corresponding reference signals into the plurality of calibration nodes only one at a time. The serial interconnection system also includes an input node and the apparatus further includes a signal source electrically connected to the input node.

Still other embodiments include one or more of the following features. The serial interconnection system includes a first serial interconnection serially interconnecting the first node, the plurality of connection nodes, and the second node, and wherein the plurality of calibration nodes is the same as the plurality of connection nodes. Alternatively, the serial interconnection system includes a first serial interconnection having a portion thereof serially interconnecting the first node, the plurality of calibration nodes, and the second node and a second serial interconnection having a portion thereof serially interconnecting the plurality of connection nodes, wherein the first serial interconnection and the second serial interconnection are separate. The portion of the first serial interconnection that serially interconnects the plurality of calibration nodes and the portion of the second serial interconnection that serially interconnects the plurality of connection nodes are electrically matched. Alternatively, the serial interconnection system includes a first serial interconnection having a portion thereof serially interconnecting the second node and the plurality of calibration nodes, a second serial interconnection having a portion thereof serially interconnecting the second node and the plurality of calibration nodes, and a third serial interconnection having a portion thereof serially interconnecting the plurality of connection nodes. The portion of the first serial interconnection that serially interconnects the plurality of calibration nodes, the portion of the second serial interconnection that serially interconnects the plurality of calibration nodes, and the portion of the third serial interconnection that serially interconnects the plurality of connection nodes are electrically matched.

In general, in still yet another aspect, the invention features an apparatus including: a serial interconnection system having a first node, a second node, a plurality of calibration nodes that are electrically connected in series by the serial interconnection system, and a plurality of connection nodes corresponding to the plurality of serially connected calibration nodes, the plurality of connection nodes electrically connected in series by the serial interconnection system; a magnitude detector electrically connected to the first and second nodes of the serial interconnection system for determining a product of the magnitudes of signals sensed at the first and second nodes; a plurality of switchably controlled signal sources, each switchably controlled signal source connected to a different corresponding one of the plurality of calibration nodes; and a controller system. The controller system is programmed to perform the functions of: for each of the plurality of calibration nodes, performing a measurement procedure involving: causing the switchably controlled signal source for that calibration node to inject a corresponding reference signal into that calibration node; and while the corresponding reference signal is being injected into that calibration node, causing the magnitude detector to determine a product of the magnitudes of signals appearing at the first and second nodes; from the determined magnitude products for the plurality of calibration nodes, computing magnitude corrections for each of the plurality of calibration nodes; and applying the magnitude corrections computed for each of the plurality of calibration nodes to the corresponding plurality of connection nodes.

Other embodiments include a switchably controlled first signal source connected to the first node; and wherein the controller system is further programmed to perform the functions of: causing the switchably controlled first signal source to inject a first reference signal into the first node; while the first reference signal is being injected into the first node, causing the magnitude detector to determine a product of the magnitudes of that injected first reference signal and a signal appearing at the second node, wherein computing magnitude corrections for each of the plurality of calibration nodes also employs the determined magnitude product for the first node.

In general, in still another aspect, the invention features an apparatus including: a serial interconnection system having a first node, a second node, a plurality of calibration nodes that are electrically connected in series by the serial interconnection system, and a plurality of connection nodes corresponding to the plurality of serially connected calibration nodes, the plurality of connection nodes also electrically connected in series by the serial interconnection system; a magnitude detector electrically connected to the first and second nodes of the serial interconnection system for determining a product of magnitudes of signals sensed at the first and second nodes; a plurality of switches for switchably electrically connecting each connection node among the plurality of connection nodes to a corresponding different calibration node among the plurality of calibration nodes;

and a controller system. The controller system is programmed to perform the functions of: for each of the plurality of calibration nodes, performing a measurement procedure involving: causing the switch for that calibration node to inject a corresponding reference signal from the corresponding connection node into that calibration node; and while the corresponding reference signal is being injected into that calibration node, causing the magnitude detector to determine a product of the magnitudes of signals appearing at the first and second nodes; from the measured magnitude products for the plurality of calibration nodes, computing magnitude corrections for each of the plurality of calibration nodes; and applying the magnitude corrections computed for each of the plurality of calibration nodes to the corresponding plurality of connection nodes.

Other embodiments include one or more of the following features. The serial interconnection system also includes an input node, and the apparatus further includes a signal source electrically connected to the input node. The apparatus also includes a first switch for switchably electrically connecting the input node to the first node, and wherein the controller system is further programmed to perform the functions of: causing the first switch to inject a signal into the first node from the input node; while the signal is being injected into the first node from the input node, causing the magnitude detector to determine a product of the magnitudes of that signal injected into the first node from the input node and a signal appearing at the second node, wherein computing magnitude corrections for each of the plurality of calibration nodes also employs the determined magnitude product for the input node.

DETAILED DESCRIPTION

Figure 1:
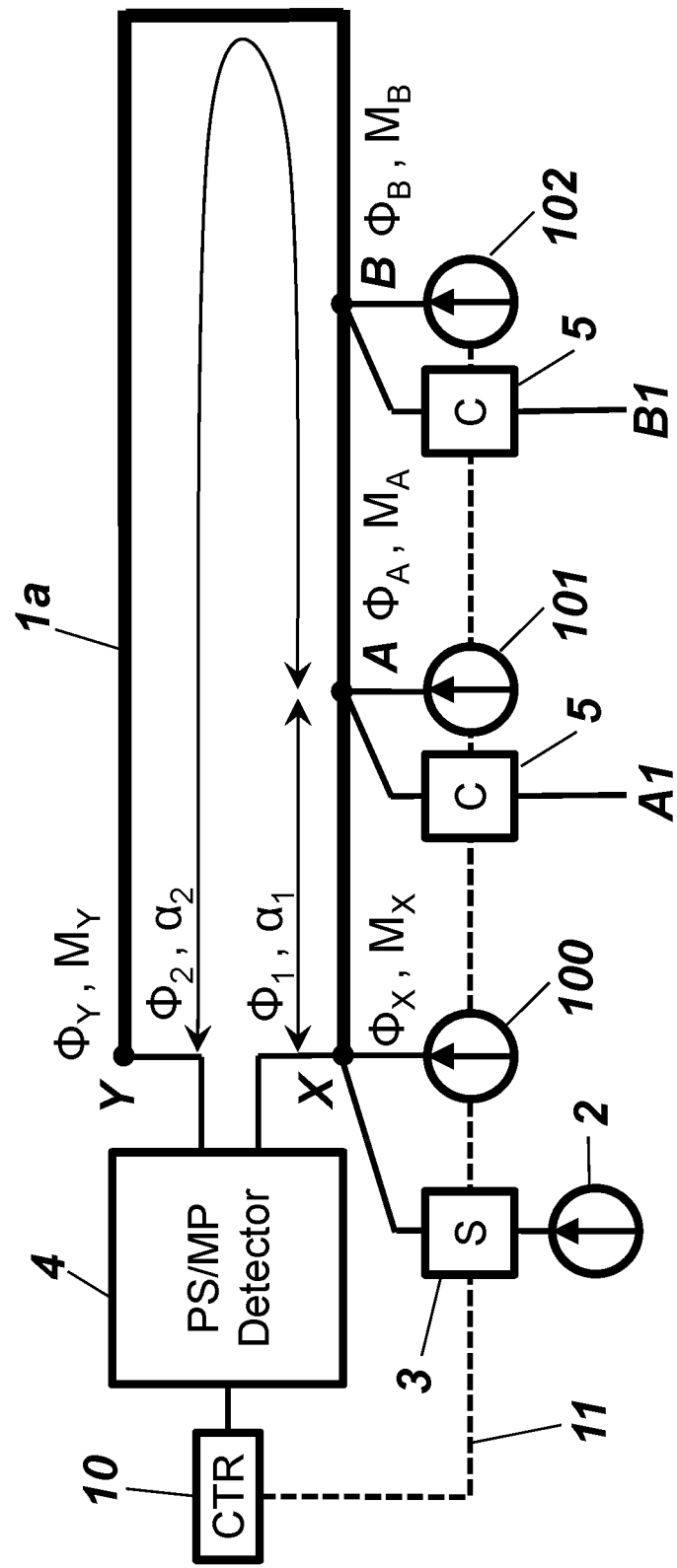
FIG. 1 depicts a simplified schematic diagram of a first method for the distribution of coherent signals over serial interconnections

A First Method for Coherent Signal Distribution Over Serial Interconnections

A first method for distributing coherent signals to large electrical distances over serial interconnections will be described with the help of the system illustrated in FIG. 1 but it should be understood that the principle of this method is more general than the specific implementation shown in FIG. 1. A serial interconnection 1a links two end points X and Y with intermediate points A and B, which may be situated at far electrical distances from points X and Y and from each other. An input signal generator 2 providing input signals to the system is coupled to serial interconnection 1a at the end point X through a switch 3. If switch 3 is on, input signal generator 2 can send signals through serial interconnection 1a to many points on this serial link including points X, A, B, and Y. Therefore, the signal generator 2b distributes its signals to all points on the serial interconnection 1a. As discussed earlier, it is beneficial for many systems that some or all the signals distributed this way are coherent, i.e. have same magnitudes and phases or have magnitudes and phases related in known relationships.

A signal applied at point X by input signal generator 2 arrives at point A with a phase difference $\Phi_1$ compared to the phase of the signal at point X and a magnitude, whose ratio to the magnitude of the signal at point X is $\alpha_1$. As this signal travels further, it reaches end point Y with a phase difference $\Phi_2$ compared to the phase of the signal at point A and a magnitude whose ratio to the magnitude of the signal at point A is $\alpha_2$. According to these definitions of $\Phi_1$, $\alpha_1$, $\Phi_2$ and $\alpha_2$ and for the case when signals propagate from point X to point Y we have the following relationships: $\Phi_1=\Phi_A-\Phi_X$ where $\Phi_A$ is the phase at node A and $\Phi_X$ is the phase at node X, $\Phi_2=\Phi_Y-\Phi_A$ where $\Phi_Y$ is the phase at node Y, $\alpha_1=M_A/M_X$ where $M_A$ is the magnitude at node A and $M_X$ is the magnitude at node X and $\alpha_2=M_Y/M_A$ where $M_Y$ is the magnitude at node Y. Observe that for node A the total loop delay is equal to $\Phi_1+\Phi_2=\Phi_Y-\Phi_X$ and this is a constant for all nodes. Also note that the total loop gain is equal to $\alpha_1*\alpha_2=M_Y/M_X$, and this is also constant for all nodes.

Notice also that these relationships between the relative quantities $\Phi_1$, $\alpha_1$, $\Phi_2$ and $\alpha_2$ and the absolute quantities $\Phi_X$, $\Phi_A$, $\Phi_Y$, $M_X$, $M_A$, $M_Y$, are valid only when the signals propagate from node X to node Y, as they normally do when the generator 2 distributes signals to all nodes over the serial interconnection. In any other signal propagation modes over the serial interconnection 1a, the corresponding relationships between relative and absolute quantities are like the relationships above but different (different signs corresponding to reverse propagation, when appropriate).

The first objective of this distribution method is to determine the quantities $\Phi_A$ and $M_A$ without assuming that the transmission properties of serial interconnection 1a are predictable over the entire or any portion of serial interconnection 1a. Furthermore, we assume that any signal sources or circuits coupled to points X, A, B, and Y have no access to any global phase and magnitude references and therefore have no means of determining how the phases and magnitudes of the signals at their respective nodes relate to the phases and magnitudes at the other nodes. These conditions occur in many practical applications where serial connectivity is used.

An additional assumption for the first method discussed here is that the operating frequency in the system of FIG. 1 is known at all nodes. This is not a fundamental or hard limitation because the operating frequency can be communicated over the Serial Interconnection 1a from connection point X to all other connection points including A, B, and Y during the initialization of the system (before starting any phase/magnitude calibration process). One way of doing this is by adding tunable frequency references at points A, B, and Y (not shown in FIG. 1), which would adjust to the frequency of input signal generator 2 during system initialization. In this way, connection points A, B, and Y obtain and maintain knowledge of the operating frequency at connection point X. It is emphasized that while transferring knowledge of the operating frequency from point X to A, B and X is straightforward, as mentioned above, the phase and magnitude changes occurring over serial interconnection $1a$ remain unknown before the methods described in this application are applied.

Using only two intermediate points (A and B) in the system of FIG. 1 is sufficient to explain the first distribution method as well as other distribution methods to be introduced later. However, this first and other distribution methods described herein remain valid even if we add as many intermediate points as necessary to suit any particular application. This will become more apparent after the methods are described.

Serial interconnection $1a$ may be a simple transmission line properly terminated at both ends or any other passive or active serial connectivity. One requirement for serial interconnection $1a$ is to propagate signals in both directions without reflections at the end points or at any intermediate points. Another requirement is to split an injected signal at an intermediate point into components launching in opposite directions with known relative phases and magnitudes (e.g. same phase and equal magnitudes, or with a known phase difference and a known magnitude ratio). In other words, any signal injected into serial interconnection $1a$ at an intermediate point is assumed to split predictably into components, which travel in opposite directions towards the end points, these components not generating reflections as they pass by other intermediate points and getting fully absorbed at the end points by appropriate terminations. If a signal is injected at one of the end points, it will produce only a single component travelling towards the other end point.

The system in FIG. 1 further contains a subsystem 4 coupled to the two end points of serial interconnection $1a$ and capable of detecting the phase sum and magnitude product between the signals at the end points. For this reason, subsystem 4 is called a phase-sum/magnitude-product detector or PS/MP detector 4. PS/MP detector 4 passes to a controller (CTR) 10 the phase-sum and magnitude-product values it detects from the end points of serial interconnection $1a$. CTR 10 has control bus 11 for turning on and off switch 3 and (switch-controlled) signal sources 100, 101, and 102 independently (e.g., using separate digital addresses). These signal sources 100, 101, and 102 are coupled to serial interconnection $1a$ at connection points X, A, and B, respectively, and are assumed to have the same operating frequency as the signal of input signal generator 2 but arbitrary phases and magnitudes without any mutual relationships. The coupling of these sources to serial interconnection $1a$ can be done by direct connections, by capacitive couplers, by inductive couplers, or by any other non-directional signal coupling methods.

Also, through control bus 11, the CTR 10 can set the states of calibration circuits 5 independently. Each calibration circuit 5 is coupled to serial interconnection $1a$ at connection point A or B, respectively, and receives a signal from this node. Calibration circuit 5 shifts the phase and scales the magnitude of the received signal and outputs the resulting signal at nodes A1 or B1, respectively. The state of calibration circuit 5 defines the amount of phase shift and magnitude scaling done by calibration circuit 5. A typical calibration circuit 5 is a serial combination of a Variable Gain Amplifier (VGA) with a programmable phase shifting or phase rotator circuit.

Figure 2:
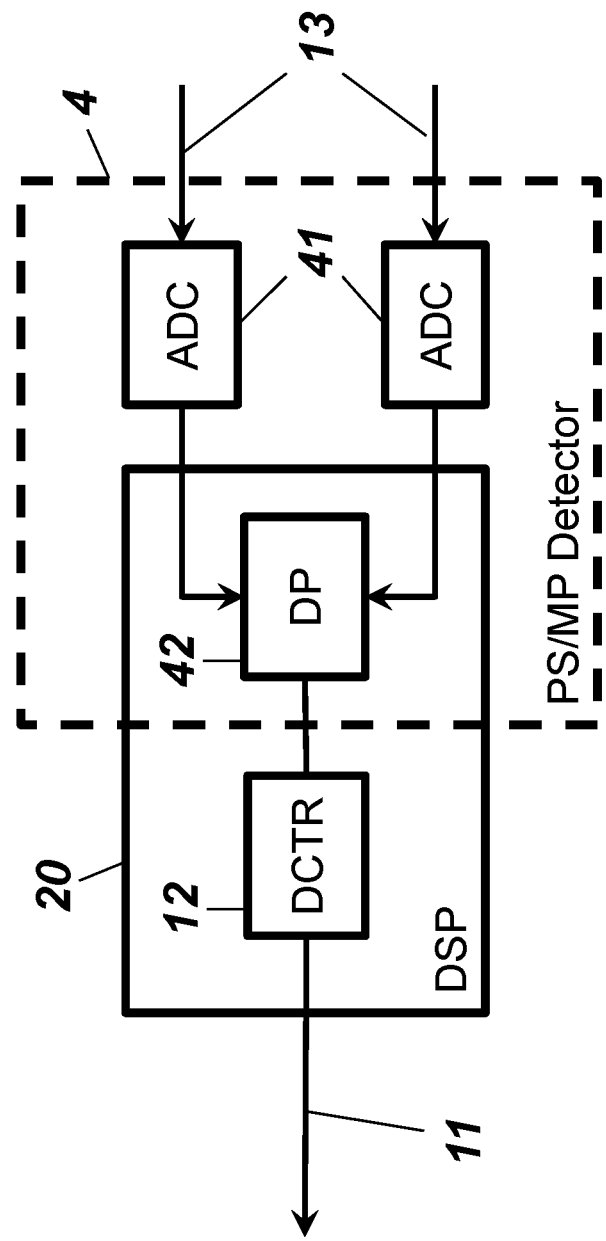
FIG. 2 depicts a simplified schematic diagram of a possible PS/MP Detector and Controller (CTR).

In general, the PS/MP detector 4 and CTR 10 can be implemented in various ways with the use of analog, digital, mixed-signal circuits, and possibly with software. A preferred implementation is shown in FIG. 2 where the PS/MP detector 4 has two analog-to-digital converters (ADC) 41 and a digital processor (DP) 42, and where the CTR (10 in FIG. 1) is a digital controller (DCTR) 12. DP 42 and DCTR 12 are implemented in software running on a digital signal processor (DSP) 20.

The two analog-to-digital converters (ADC) 41 digitize the two input signals 13, which are received from the end points X and Y of serial interconnection $1a$ of FIG. 1. In cases where direct digitization of the signals 13 is impractical (e.g. signal frequency too high for ADCs used), a downconverter (e.g. mixer) is added before digitization (not shown in FIG. 2 and assumed included in the ADC block 41). DP 42 extracts the phase and magnitude values from the two digitized signals (e.g. by Fourier transform or similar techniques) and performs phase summation and magnitude multiplication. DCTR 12 performs the sequential control steps and calculations necessary for detecting and compensating the phase and magnitude changes in serial interconnect $1a$. These control steps and calculations are described next, and are valid in principle for any other implementations of PS/MP detector 4 and of CTR 10, not just for the example implementation shown in FIG. 2.

The detection of phase/magnitude changes in serial interconnection $1a$ in FIG. 1 is done as follows. CTR 10 first turns off switch 3 in FIG. 1, blocking the input signal from being coupled into serial interconnection $1a$. Then, CTR 10 turns on signal source 100 while signal sources 101 and 102 are off. PS/MP detector 4 detects the overall phase sum $PS0 = \Phi_X + \Phi_X + \Phi_1 + \Phi_2$ and the overall magnitude product $MP0 = M_X * M_X * \alpha_1 * \alpha_2$ and passes these values to CTR 10, which stores them. The equations above for PS0 and MP0 follow simply from the facts that $\Phi_Y = \Phi_X + \Phi_1 + \Phi_2$ and $M_Y = M_X * \alpha_1 * \alpha_2$.

Next, CTR 10 turns off signal source 100 and turns on signal source 101. This time PS/MP detector 4 detects a phase sum $PS1 = \Phi_A + \Phi_1 + \Phi_A + \Phi_2$ and a magnitude product $MP1 = M_A * \alpha_1 * M_A * \alpha_2$, assuming the signal of source 101 splits equally into components travelling in opposite directions over serial interconnection $1a$. These equations follow from the propagation conditions of the signal from source 101 and from the assumption that the serial interconnect is reciprocal (phase and magnitude changes over any portion of the serial interconnection are the same for both propagation directions). Once again, PS/MP detector 4 passes the values PS1 and MP1 to CTR 10, which stores them.

Based on information now available, CTR 10 first calculates the quantities $(PS1-PS0) = 2*(\Phi_A - \Phi_X)$ and $(MP1/MP0) = (M_A/M_X)^2$ by a simple subtraction and division. Notice that relative quantities $\Phi_1$, $\Phi_2$, $\alpha_1$ and $\alpha_2$ drop from the two new equations. Considering $\Phi_X$ and $M_X$ as respective references for phase and magnitude, for example $\Phi_X = 0$ and $M_X = 1$, CTR 10 further calculates $\Phi_A = (\frac{1}{2})*(PS1-PS0)$ and $M_A = SQRT(MP1/MP0)$, where $SQRT(x)$ is the square root function. Based on these results, CTR 10 also calculates the quantities $\Phi_1$, $\Phi_2$, $\alpha_1$ and $\alpha_2$ through obvious simple formulas (e.g. $\Phi_1 = \Phi_A - \Phi_X$; $\Phi_2 = \Phi_Y - \Phi_A$; $\alpha_1 = M_A/M_X$; and $\alpha_2 = M_Y/M_A$).

The same process is applied for point B to calculate $\Phi_B$ and $M_B$, the phase and magnitude at this point. To this end, CTR 10 turns off signal source 101 and turns on signal source 102, repeating the method as for point A. In general, the phase and magnitude of any other point in the serial interconnect $1a$ can be calculated by this method. In some applications, such as phased antenna arrays (see FIG. 7), only the relative changes in phase and magnitude from one antenna element to another (e.g. from one point on serial interconnection 1a to another) are relevant. In these cases, signal source 100 is not necessary and can be eliminated. The role of the signal source 100 is then played by the signal source at the first point in the serial interconnection 1a encountered by the signal propagating form node X to node Y.

After CTR 10 has determined the values $\Phi_A$, $\Phi_B$, $M_A$, $M_B$ as well as the additional similar quantities for all distribution points on the serial interconnection 1a according to the method described above, CTR 10 sets the states of calibration circuits 5 in order to reverse the phase and magnitude changes occurring at points A and B (plus all others points not shown in FIG. 1) due to signal transport over serial interconnection 1a. The desired result is that when the signal of input signal generator 2 is switched into serial interconnection 1a through switch 3, it arrives at points A1 and B1 in phase and with equal magnitudes. CRT 10 sets the phase and magnitude shifts of calibration circuits 5 with appropriate values, which can be calculated directly from the values of $\Phi_A$, $\Phi_B$, $M_A$, and $M_B$. For example, the equalization of point A1 with respect to point X is accomplished by setting a $N*\pi-\Phi_A$ phase shift (where N is an integer) and a $1/M_A$ magnitude scaling in calibration circuit 5 connected to point A. In this way, the phases and magnitudes at points A1 and X become equal. The addition of the $N*\pi$ phase shift is necessary in practice to ensure that we have a causal system (phase always advances with time). Similarly, the equalization of point B1 with respect to point X is accomplished by setting a $N*\pi-\Phi_B$ phase shift and a $1/M_B$ magnitude scaling in calibration circuit 5 connected to point B.

An important property of this first method is that it requires no matching of any parameters, signal sources, or other components, except for the operating frequency of sources 100, 101, and 102, as discussed previously. Clearly, the same method can be used for serial interconnections with more than two points. Also, it is straightforward to apply this method to cases other than the case discussed above, such as when input signal generator 2 is connected to a different node than X. In these other cases, the detection process of the quantities $\Phi_A$, $\Phi_B$, $M_A$, $M_B$, etc. is the same but the calculation of compensating states for calibration circuits 5 is based on different equations, which result from the particular propagation conditions of each case.

A Second Method for Calibrating a Serial Interconnection

A limitation of the first coherent distribution method described above is that it is not possible to detect the phase/magnitude values over serial interconnect 1a while input signal generator 2 is driving serial interconnect 1a. Moreover, turning on any of signal sources 100, 101, or 102 would interfere with the propagation of the signals from input signal generator 2 and the latter signals would produce errors in the output of PS/MP detector 4. Clearly, this problem is the consequence of the fact that the same serial interconnection is used both for signal distribution and for sensing the phase/magnitude values. Therefore, if it is necessary to repeat or recheck the calibration of serial interconnection 1a, generator 2 must be disconnected from serial interconnection 1a by turning off switch 3. In some applications, this is not acceptable. For example, if serial interconnection 1a carries signals used in a live communication network, switching off input signal generator 2 interrupts the communication. Yet, field operation conditions may change the transmission properties of serial interconnection 1a requiring a repeat of the phase/magnitude calibration process. The first method provides no possibility of calibrating the serial interconnection without stopping the operation of the serial interconnection.

A second coherent distribution method described next remedies the above shortcoming of the first method. This second method will be described with the help of the system illustrated in FIG. 3 but the principle of this method is more general than the implementation illustrated in FIG. 3. Rather than using a single serial interconnection, the second method uses two matched serial interconnections: serial interconnection 1 and serial interconnection 1a. By matched interconnections we mean that they are practically identical in propagation properties for a section X to W on serial interconnection 1 and a corresponding section X' to W' on serial interconnection 1a, respectively. A simple practical realization of matched serial interconnections is by matched transmission lines on a low cost printed circuit board (PCB) using symmetric layouts placed in close (parallel) proximity to each other.

Figure 3:
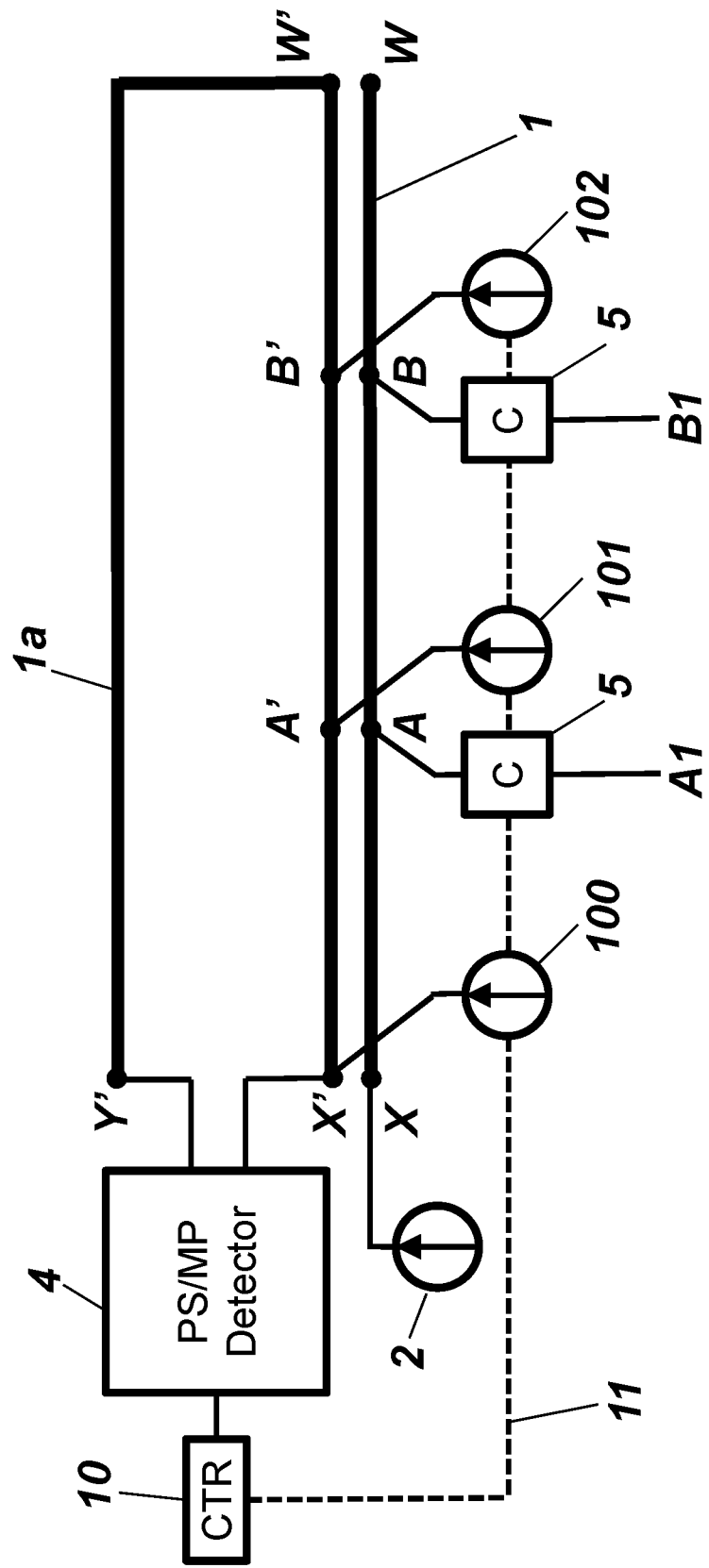
FIG. 3 depicts a simplified schematic diagram of a second method for the distribution of coherent signals over serial interconnections

The main difference between the system in FIG. 3 and that of FIG. 1 is the separation between the sensing serial interconnection and the distribution serial interconnection. Serial interconnection 1a is used for sensing the phases and magnitudes at points X', A', B' and Y' with the same procedure as were used in the first method employing PS/MP detector 4 and sources 100, 101, and 102. Input signal generator 2 drives serial interconnection 1, which carries the signals from this generator to all points in serial interconnection 1, including points X, A, B, and W. No switch is necessary to disconnect input signal generator 2 from serial interconnection 1 since the sensing operation is done on serial interconnection 1a.

The points X', A', B', and W' in serial interconnection 1a are selected to be equivalent to points X, A, B, and W from the signal transmission point of view. This selection is possible because the two serial interconnections are assumed to be matched. Therefore, the phase and magnitude values at any point in serial interconnection 1a are equal to the phase and magnitude values of the equivalent point in serial interconnection 1, assuming generators 1 and 100 have the same phases and magnitudes. It follows that the phase and magnitude values sensed in serial interconnection 1a can be used to calibrate serial interconnection 1. The actual calibration is done with CTR 10 and calibration circuits 5 by using the same procedure as was used according to the first method. Clearly, the system in FIG. 3 can calibrate the operating serial interconnection 1 as often as necessary without interrupting the flow of the signals from input signal generator 2. In addition, the frequency of input signal generator 2 is automatically available at all points X, A, B, and Y, which are close physically to the equivalent points X', A', B', and Y', respectively.

A Third Method for Calibrating a Serial Interconnection

In both the first and the second distribution methods described above, the sensing of phase and magnitude values at points on a serial interconnection is done by sending signals in both directions over the serial interconnection from the respective points. As indicated before, it is essential that there are no reflections of signals at any points or otherwise sensing errors occur. Reflections create standing wave patterns that change the equations given in the description of the first method in manners very difficult to predict in practice. The most critical points where detrimental reflections can occur in practice are the end points X, W, X' and Y' in the system of FIG. 3. These reflections are triggered by imperfect matching networks terminating the serial interconnections. Since these matching networks must absorb the entire power of the signals propagating over the serial interconnection, even small matching errors can still create bothersome reflections. Unlike the end points, the intermediate points A, B, A' and B' in FIG. 3 are less prone to generating significant reflections because the couplers can be designed with low coupling coefficients, which naturally reduce reflections even in the presence of small mismatches. For the first and second calibration methods, the problem of end-point reflections can be mitigated only by using excellent terminations.

A third coherent distribution method described next extends the concepts of the first and second distribution methods for the case when some reflections are allowed to occur at the end points of the serial interconnection. This method is important in practice because building serial interconnections with essentially perfect matching at the ends (practically zero reflections) is more difficult and costly than building serial interconnections with good but not perfect matching at the ends. This third method will be described with the help of the system illustrated in FIG. 4; but the principle of this method is more general than what is shown in FIG. 4.

Figure 4:
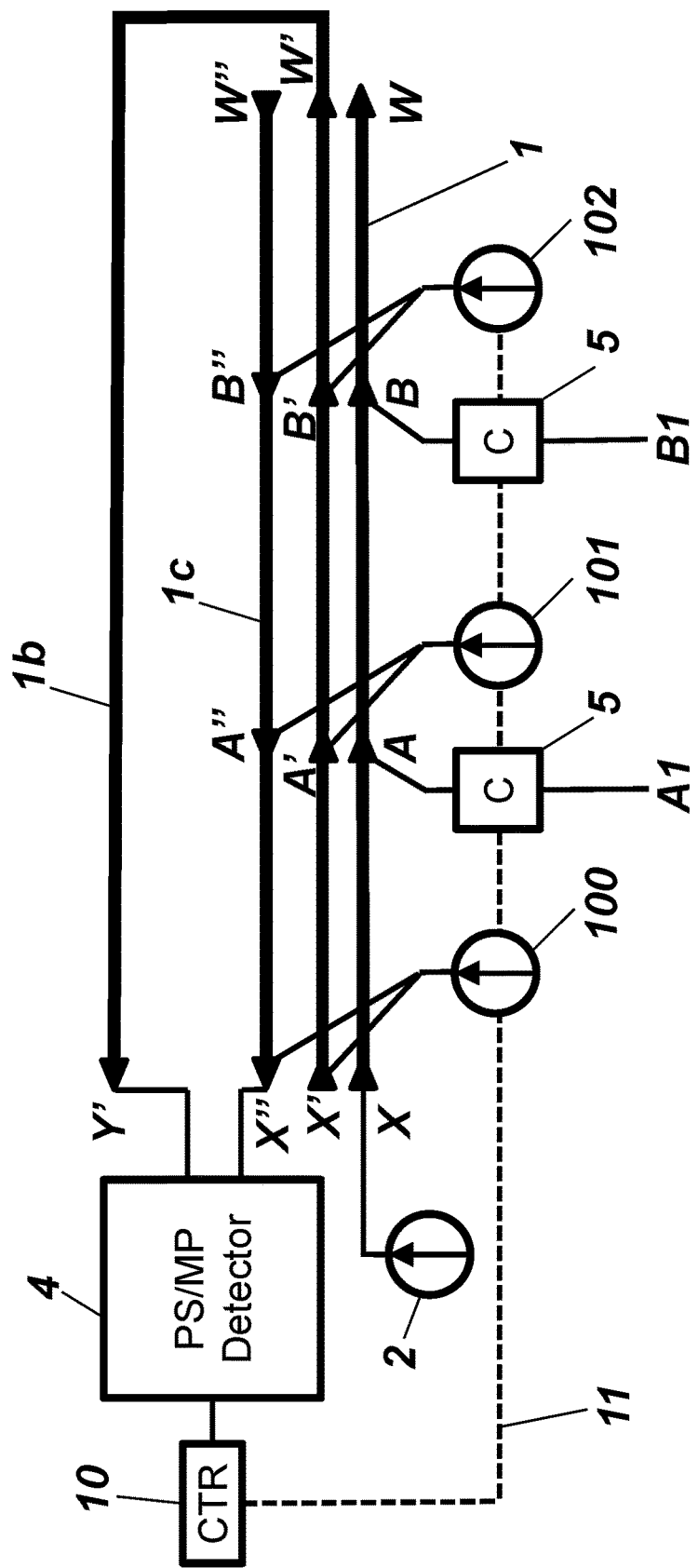
FIG. 4 depicts a simplified schematic diagram of a third method for the distribution of coherent signals over serial interconnections

The system of FIG. 4 uses three matched serial interconnections and directional couplers rather than non-directional couplers. A directional coupler couples only signals propagating in a particular direction and ignores the signals propagating in the opposite direction. A serial interconnection 1 carries the signals of input signal generator 2 to the points A and B (as before, only two points are considered without any loss of generality). Calibration circuits 5 receive these signals through directional couplers arranged such as to couple any signal propagating from left-to-right on serial interconnection 1. The advantage of using directional couplers is that any reflections from the end point W travelling back from right-to-left are ignored by the couplers (substantially attenuated) and do not enter calibration circuits 5. This is basically equivalent to having a perfect termination at point W. When the reflections from point W reach the end point X and if the termination at point X is not perfect, the reflections from point W get reflected back into the left-to-right direction. In theory, these second-order reflections produce phase and magnitude errors in the system because they do enter calibration circuits 5. However, in practice, by the time the signal of input signal generator 2 propagates over serial interconnection 1 forward, backward, and forward again, the loss over this long path and the power absorptions at the end points (we assume not perfect but reasonably good terminations) usually reduce the remaining detrimental reflections to inconsequential levels.

The sensing of the phase and magnitude changes over serial interconnection 1 is done just as for the first and second methods but by using two matched serial interconnections (serial interconnection 1b and serial interconnection 1c) and directional couplers. Serial interconnection 1b carries signals only from left-to-right in the section between points X' and W' and serial interconnection 1c carries signals only from right-to-left in the section between points X" and W". The set of points X, A, B, and W is equivalent to the set of points X', A', B' and W' and it is also equivalent to the set of points X", A", B" and W" because serial interconnections 1, 1b, and 1c are matched over the sections A to W, A' to W', and A" to W". In this embodiment, connection points X', A', and B' and connection points X", A", and B", respectively, are electrically connected together to represent nodes so that connection points X' and X" represent a node, connection points A' and A" represent another node, and connection points B' and B" represent yet another node. Signal sources 100, 101, and 102 inject equal signals into serial interconnections 1b and 1c. Since the sections X to W, X' to W', and X" to W" are matched, it follows that the phase and magnitude changes sensed in serial interconnections 1b and 1c can be used to calibrate serial interconnection 1. Compared to the first and second distribution methods, the added benefit is that any reflections in serial interconnections 1, 1b, and 1c, which are not excessive, do not produce practical errors.

A Fourth Method for Calibrating a Serial Interconnection

In the second and the third coherent distribution methods described above, we sense the phases and the magnitudes at points on serial interconnections that are different from serial interconnection 1, which is used for distributing the signal of input signal generator 2. As a result, the calibration signals used over serial interconnections 1a, 1b, and 1c may be different from the signals distributed over serial interconnection 1. For example, if the signal of input signal generator 2 is a bandpass modulated signal (e.g. typical communication signal), the calibration signals on serial interconnections 1a, 1b, and 1c could be a single non-modulated tone. The frequency of this tone must be such that the transmission properties (phase and magnitude changes) of the serial interconnections at all frequencies used in the system are the same or can be derived from values valid at one frequency within the set of frequencies considered. Usually, this is the case when the frequency of the tone is close enough to the frequencies of the bandpass modulated signal and when the bandwidth of the bandpass modulated signal is within a limit.

Figure 5:
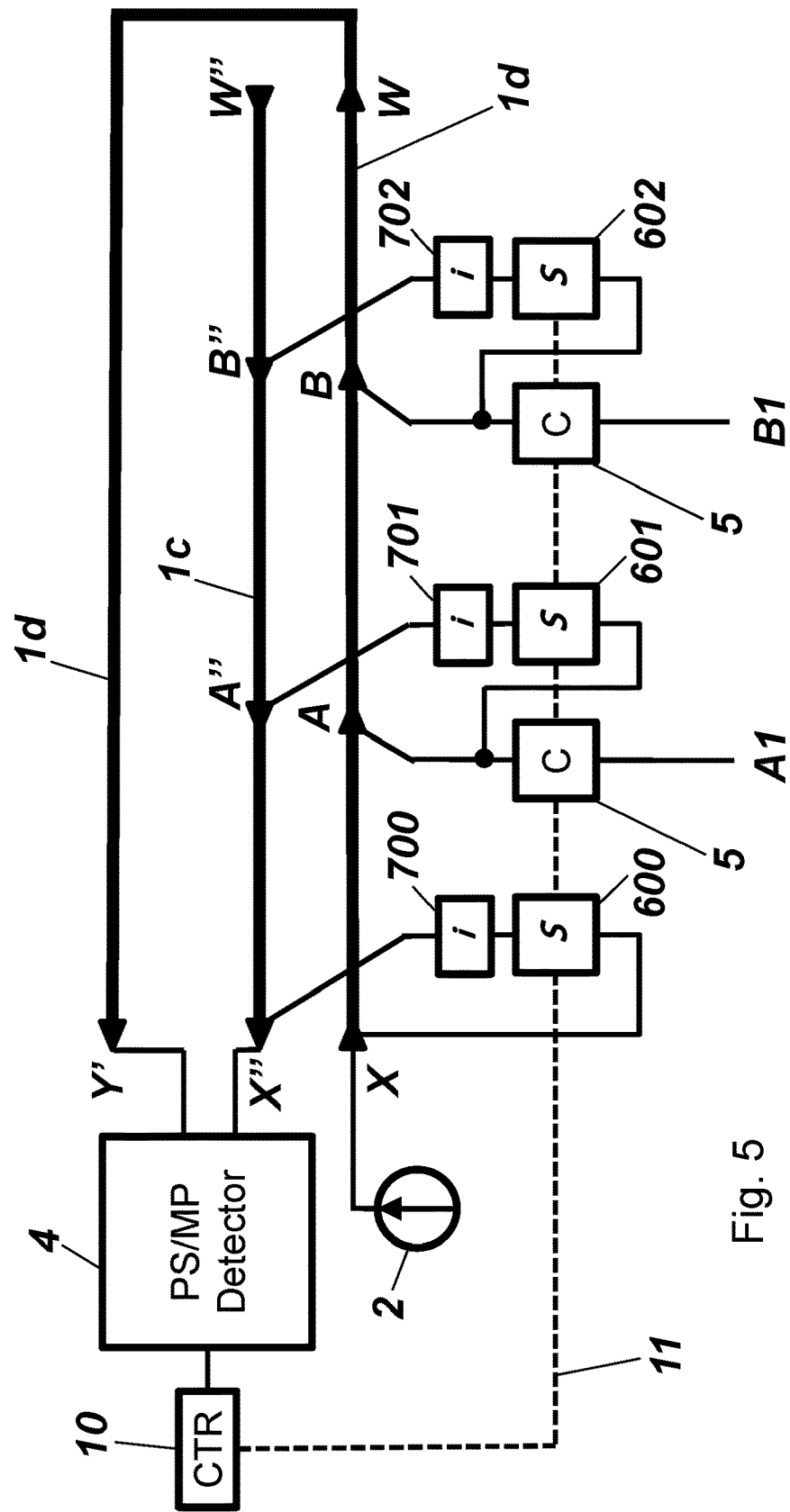
FIG. 5 depicts a simplified schematic diagram of a fourth method for the distribution of coherent signals over serial interconnections

In some cases, the signals of input signal generator 2 could be used as calibrating signals as well. A simple example is LO (local oscillator) distribution when input signal generator 2 produces a CW (continuous wave) signal. In such cases, the third method can be modified as shown in FIG. 5 to obtain a fourth method. More specifically, serial interconnections 1 and 1b are replaced by a serial interconnection 1d, which carries the signal of input signal generator 2 and at the same time performs the calibration function of serial interconnection 1b in the third method (see FIG. 4). Switches 600, 601, 602 and signal injection circuits 700, 701, 701 are added to provide the capability of using the signal from input signal generator 2 for calibration. Switches 600, 601, and 602 are controlled by CTR 10. Signal injection circuits 700, 701, and 701 receive signals from a corresponding point on serial interconnection 1c when switches 600, 601, and 602, respectively, are on and inject them into serial interconnection 1d. The phases and magnitudes of the injected signals at points X", A", and B" must be related to the phases and magnitudes of the signals at points X, A, and B, respectively, in known relationships (e.g. if they are matched portions of the serial interconnections). For example, the injected signals at points X", A", and B" could have the same phases and magnitudes as the signals on serial interconnection 1 at points X, A, and B. A better choice for minimizing detrimental reflections at points X", A", and B" would be to inject signals with reduced magnitudes.

The operation of the fourth method shown in FIG. 5 mimics the operation of the other methods described earlier with the difference that in this case CTR 10, instead of turning on/off signal sources 100, 101, and 102 (see FIGS. 1, 2, and 4), turns on/off switches 600, 601, and 602 according to the same scheme of the other methods. If the signals injected at points X", A", and B" equal the signals at points X, A, and B, respectively, the equations describing the relationships between the various phases and magnitude used by the first method are valid as well for the fourth method. However, if the signals injected at points X", A", and B" have a different relationship to the signals at points X, A, and B, respectively, the equations describing the relationships between the various phases and magnitudes change accordingly. In any event, the equations can be solved by simple elementary algebra.

Generalizations

Starting with the four methods described above for coherent signal distribution over a serial interconnection, other possibilities may be derived. For example, the first method can be applied with directional couplers if a second serial matched interconnection is introduced. This would be equivalent to using serial interconnections 1c and 1d of the fourth method of FIG. 5 with signal sources 100, 101, and 102 injecting equal signals into the two serial interconnections instead of using switches 600, 601, and 602 and signal injection circuits 700, 701, 701. Just as in the case of the first method, this variation would not be capable of calibrating and distributing the signals of input signal generator 2 at the same time.

We have already mentioned that the four methods discussed can be used with signals that are more complex than CW signals. For example, the fourth method may be applied with a modulated bandpass signal. In that case, however, the PS/MP detector must perform appropriate signal processing techniques, which are different from what would be applied when CW signals are use. Similarly, other techniques could also use appropriately modulated calibration signals provided by the signal sources 100, 101, and 102 in order to reduce the noise in the calibration process and thus increase the precision of the calibration.

Programmed Controller

Figure 6:
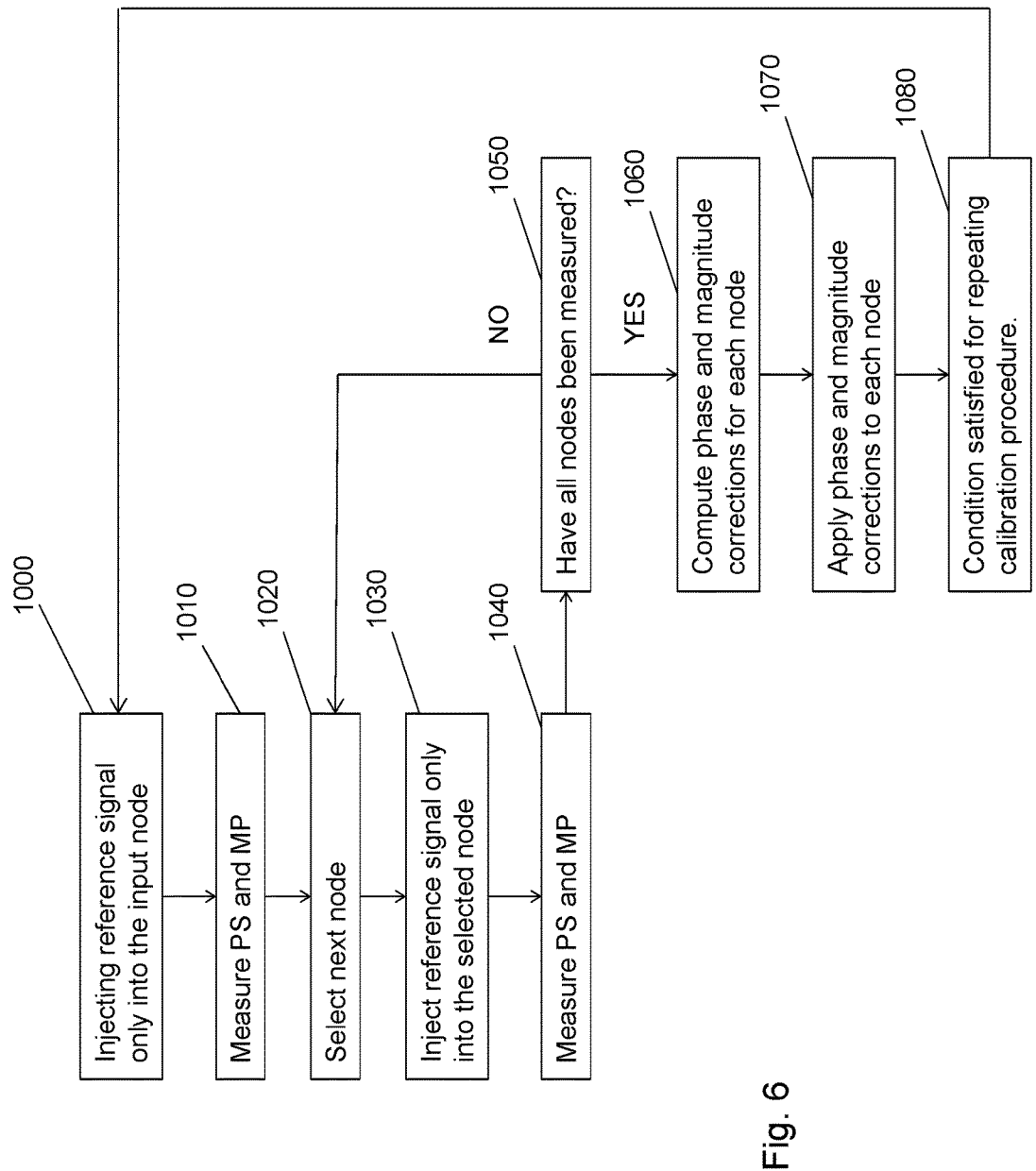
FIG. 6 is a flow chart of an algorithm for calibrating a serial interconnection as described herein.

Referring to FIG. 6 depicting an exemplary embodiment, the controller (or processor system) is programmed to perform the illustrated operations to calibrate the serial interconnection system.

First the controller causes a switch to disconnect the signal source from the system (if required). With the signal source disconnected, the controller causes a reference signal to be injected into the first node at one end of the serial interconnection system (1000). In some embodiments, this node is the same as the node to which the signal source was connected. While the reference signal is being injected into the first node, the controller causes the detector to measure the phase sum and the magnitude product of the injected reference signal and a signal appearing at a second end node of the serial interconnection system (1010). The controller records these measurements in memory for use at the end of the calibration process.

After making these initial measurements, the controller performs the following operations for each node along the serial interconnection system. With the signal source disconnected, the controller selects a node (1020) and causes a reference signal to be injected only into the selected node (1030). In other words, no references signals are injected into any of the nodes except the selected node. While the reference signal is being injected into the selected node, the controller causes the detector to measure the phase sum and the magnitude product of the signal appearing at the first node and a signal appearing at the second end node of the serial interconnection system (1040). The controller records these measurements in memory for use at the end of the calibration process.

This procedure is repeated for each node in the system until measurements have been made and recorded for all of the nodes (1050).

When the procedure is completed for all nodes, the controller uses the measured phase sums and magnitude products for the first node and the plurality of serially connected nodes and computes phase and magnitude corrections for each of the plurality of serially connected nodes (1060). This computation is done as described previously.

After the controller has computed phase and magnitude corrections for all of the serially connected nodes, the controller applies these corrections to the serially connected nodes, e.g. by adjusting the phase rotators and gain amplifier appropriately and in accordance with the computed corrections (1070).

After the controller completes this set of operations, the serial interconnection is calibrated. As environmental conditions change or simply as a result of the passage of time, the interconnection will drift away from calibration and the procedure will need to be repeated. The controller can trigger the next calibration process either periodically at some preselected delay or upon detecting changes that might result in drifts away form calibration (e.g. temperature and/or humidity changes) (1080).

Application to Phased Array Antenna System Designs

Figure 7:
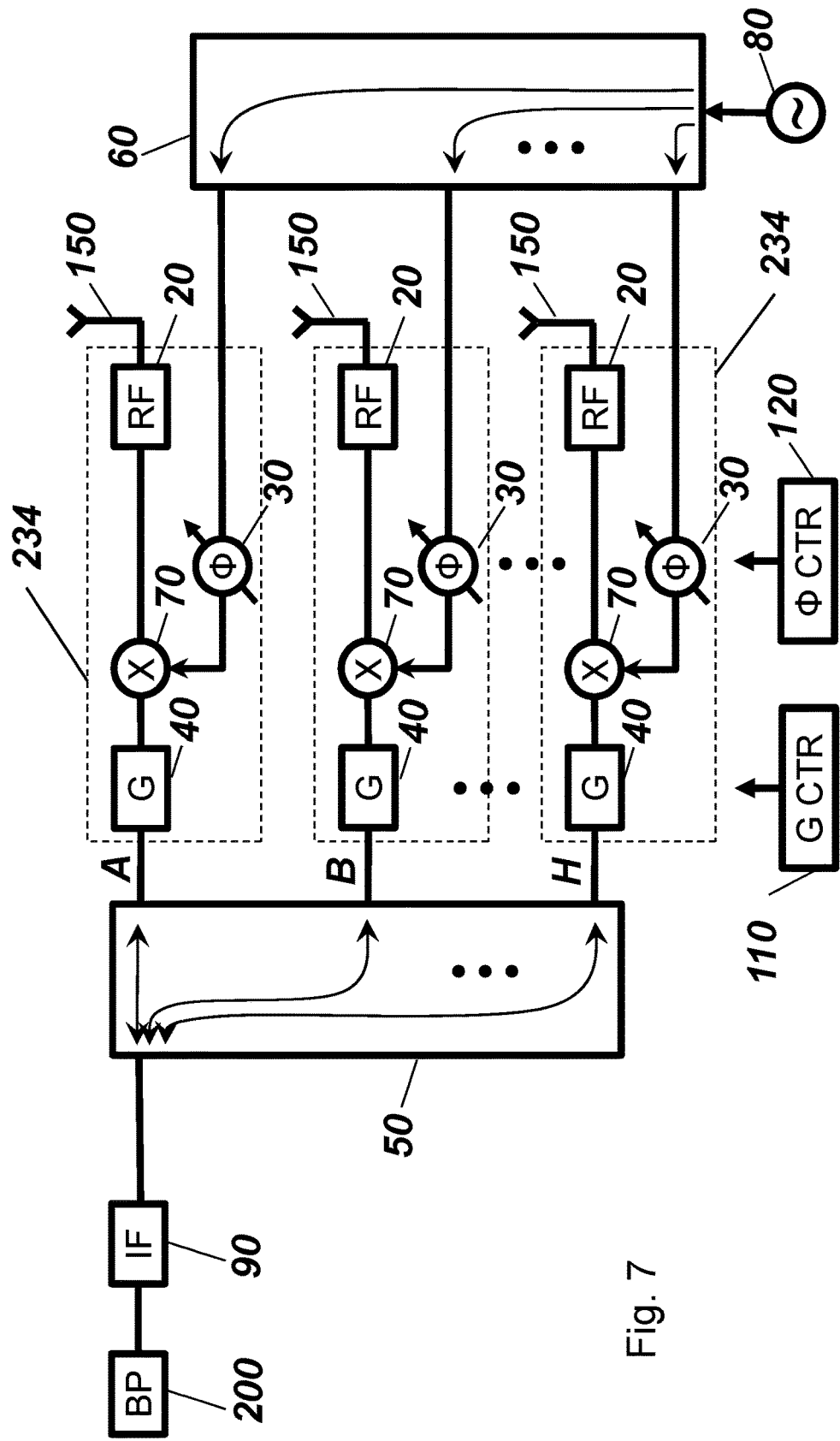
FIG. 7 is a diagram of an analog phased array in which the calibration techniques described herein can be used.

The above-described approaches for distributing coherent, phase-synchronized and equal magnitude signals have particular application to designing analog and digital phased array antenna systems. An example of an active analog phased array in which these concepts could be applied is illustrated in FIG. 7. This architecture is similar to architectures described in U.S. Pat. No. 8,611,959, all of which is incorporated herein by reference.

The active antenna array contains a plurality of antenna elements 150 placed on a grid, which may be linear, planar, or conformal to a surface. The physical separation of the antenna elements is related to the frequency of operation of the array and very often equals half the average wavelength of the signals transmitted or received. This is necessary for the array to generate narrow beams with low side lobes. Since typical arrays have a large number of elements, they are fundamentally large electrical systems. In other words, the size of the array system is large with respect to the Radio Frequency (RF) wavelengths used.

The active antenna array also includes multiple active Tx/Rx modules 234. Each Tx/Rx module 234 drives a corresponding one of antenna elements 150 for transmission and receives signals from that corresponding antenna element 150 for reception. For that purpose, each Tx/Rx module 234 contains amplifiers, filters, adjustable phase shifters 30, adjustable gain stages 40, and mixers 70. A distribution/aggregation network 50 distributes IF signals to the Tx/Rx modules 234 and aggregates received IF signals from the Tx/Rx modules 234. Another distribution network, namely, an LO distribution network 60, distributes an LO signal from a LO signal source 80 to the Tx/Rx modules 234. Mixer 7 in each Tx/Rx module 234 uses the distributed LO signal to up-convert the analog transmit IF signal to RF and it uses the distributed LO signal to down-convert the received RF signal to IF. Observe that in the described embodiment the phase shifters 30 (also referred to as phase rotators) are located in the LO signal path. This allows for much easier designs of these components because shifting the phase of a sinusoidal signal is much easier than shifting the phase of a modulated signal.

For simplicity of illustration, distribution/aggregation network 50 is shown as a single network; whereas in the described embodiment it is in fact two separate networks, one for distributing IF signal to Tx/Rx modules 234 and one for aggregating received IF signals from the Tx/Rx modules 234. Similarly, also for simplicity of illustration, the transmit and receive paths within the Tx/Rx modules 234 are shown as a single path; whereas, in the described embodiment they are separate paths, one path for up-converting the IF signal to RF and delivering that RF signal to a corresponding antenna element 150 and the other path for down-converting the received RF from antenna element 150 to IF and delivering that received IF signal to the aggregation network portion of the distribution/aggregation network 50.

The array system further includes a baseband processor 200 and an IF stage 90 with a transmit side and a received side. During transmission, baseband processor 200 sends a digital signal to the transmit side of IF stage 90, which converts this signal into an analog IF signal using digital-to-analog converters and filters and applies that analog IF signal to the input of the Tx side of distribution/aggregation network 50 which, in turn, distributes the IF signal to all Tx/Rx modules 234. During reception, the aggregated received IF signal from the Rx side of distribution/aggregation network 50 is delivered to the receive side of IF stage 90 which converts the received IF signal to digital and passes that to baseband processor 200.

In the case where the IF signals passing through the stages 90 are baseband signals (zero IF), the IF stages 90 and the mixers 70 are complex blocks, i.e. they process in-phase (I) and quadrature (Q) signals. In the present discussion, we have assumed non-zero IF values (i.e., no I/Q processing) but the discussion is also valid for the zero IF cases.

There are two control blocks, G CTR 110 and Φ CTR 120, for separately and independently setting and/or changing the settings of phase shifters 30 and gain stages 40 within Tx/Rx modules 234. This is typically done over digital control buses.

A program running in baseband processor 200 (or some other digital controller that is not shown for simplicity) drives control blocks 110 and 120. Each set of phase and gain values for all antenna elements implements a specific radiation pattern such as a narrow beam or a more complex shape and also implements the calibration corrections that were computed as described earlier. By changing these sets of phase and magnitude values appropriately, the array radiation (both transmit and receive) is shaped to implement advanced functions such as beam steering for tracking a movable target, beam scanning, fanning (changing beam size), etc.

The above-described calibration techniques can be applied to the Tx/Rx distribution networks as well as to the LO distribution networks in such as phased array antenna system.

Application to Phased Array Antenna System Calibration

Figure 8:
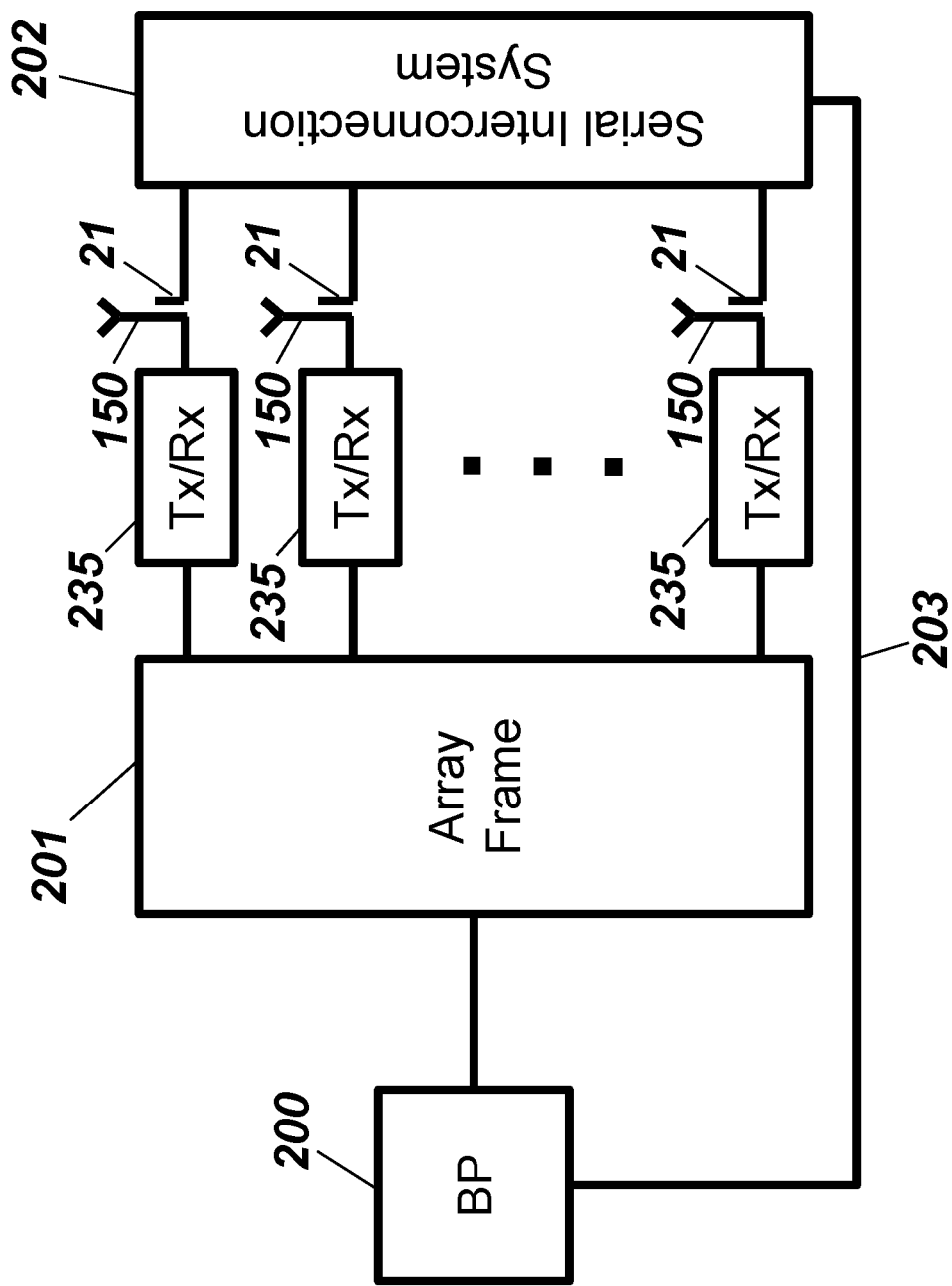
FIG. 8 illustrates a system in which the calibration techniques described herein are applied to a phased array antenna system.

The above-described approaches for calibrating a serial interconnection have also particular application to phased array calibration. An example of this application is shown in the diagram of FIG. 8. The phase array system in this diagram consists of a baseband processor 200, an array frame 201, and a plurality of Tx/Rx modules 235 coupled to a plurality of antenna elements 150. The Tx/Rx modules 235 are standard radio frequency (RF) modules similar to the blocks 234 in FIG. 7. The array frame 201 is a block containing all necessary circuits for a particular implementation of the phased array. For example, in the case of the analog phased array in FIG. 7, the array frame 201 contains the network 50, the network 60, the LO signal source 80, the IF stage 90, and the control blocks 110 and 120. For a digital phased array, the array frame 201 contains a plurality of data converters and filters, sampling clock circuits, digital transport circuits, etc. The application described here is valid for any type of phased arrays: analog, digital, or hybrid (partially analog and partially digital).

In general, the practical realization of any phased array requires that all signal paths from the baseband processor 200 to the antenna elements 150 in transmit mode and all signal paths from the antenna elements 150 to the baseband processor 200 in receive mode are essentially equal in terms of propagation phase shift and magnitude variation. This is difficult to accomplish without calibration. A serial interconnection system 202 calibrated according to the methods described above can be used for this purpose. This is illustrated in FIG. 8. Couplers 21 couple the antennas 150 to the serial interconnect system 202. The latter contains all necessary circuits for calibration as per examples in FIG. 1, 3, 4, or 5. The baseband processor 200 controls the serial interconnection system 202 and communicates with it though control/communication means 203.

For the calibration of the phase array transmit subsystem, the baseband processor 200 transmits calibration signals through the phased array to all antenna elements sequentially (i.e., one antenna at a time) and it receives respective signals back from the serial interconnection system 202. These signals couple into the interconnection system 202 through the couplers 21. Based on all phase and magnitude variation values the baseband processor 200 obtains through this process and since the serial interconnection system is calibrated, the baseband processor 200 can calculate the differences in phase and magnitude between the transmission paths through the phased array from the baseband processor to the respective antenna elements. Using these calculated values, the baseband processor 200 adjusts the phase and magnitude of each transmit path appropriately to equalize them.

For the calibration of the phase array receive subsystem, the baseband processor 200 transmits calibration signals through the serial interconnection system 202 to all antenna elements sequentially (i.e., one antenna at a time) and it receives respective signals back through the phased array. These signals couple into the phased array through the couplers 21. Based on all phase and magnitude variation values the baseband processor 200 obtains through this process and since the serial interconnection system is calibrated, the baseband processor 200 can calculate the differences in phase and magnitude between the receive paths through the phased array from the respective antenna elements to the baseband processor. Using these calculated values, the baseband processor 200 adjusts the phase and magnitude of each receive path appropriately to equalize them.

Application to Clock Distribution in Integrated Circuits or Over Circuit Boards

Another application of the above-described approaches for coherent distribution of signals over a serial interconnection is for clock distribution. In VLSI (Very Large Scale Integration) integrated circuits, high-speed clock distribution with low phase errors is one of the key enablers of the good dynamic operation. Classical methods for high-speed clock distribution including clocking trees and clocking spines are well established but suffer from high power dissipation, limited frequency scaling possibilities, and long design cycles. Similar difficulties are encountered in high speed clock distribution over large circuit boards such as for processor arrays.

Figure 9:
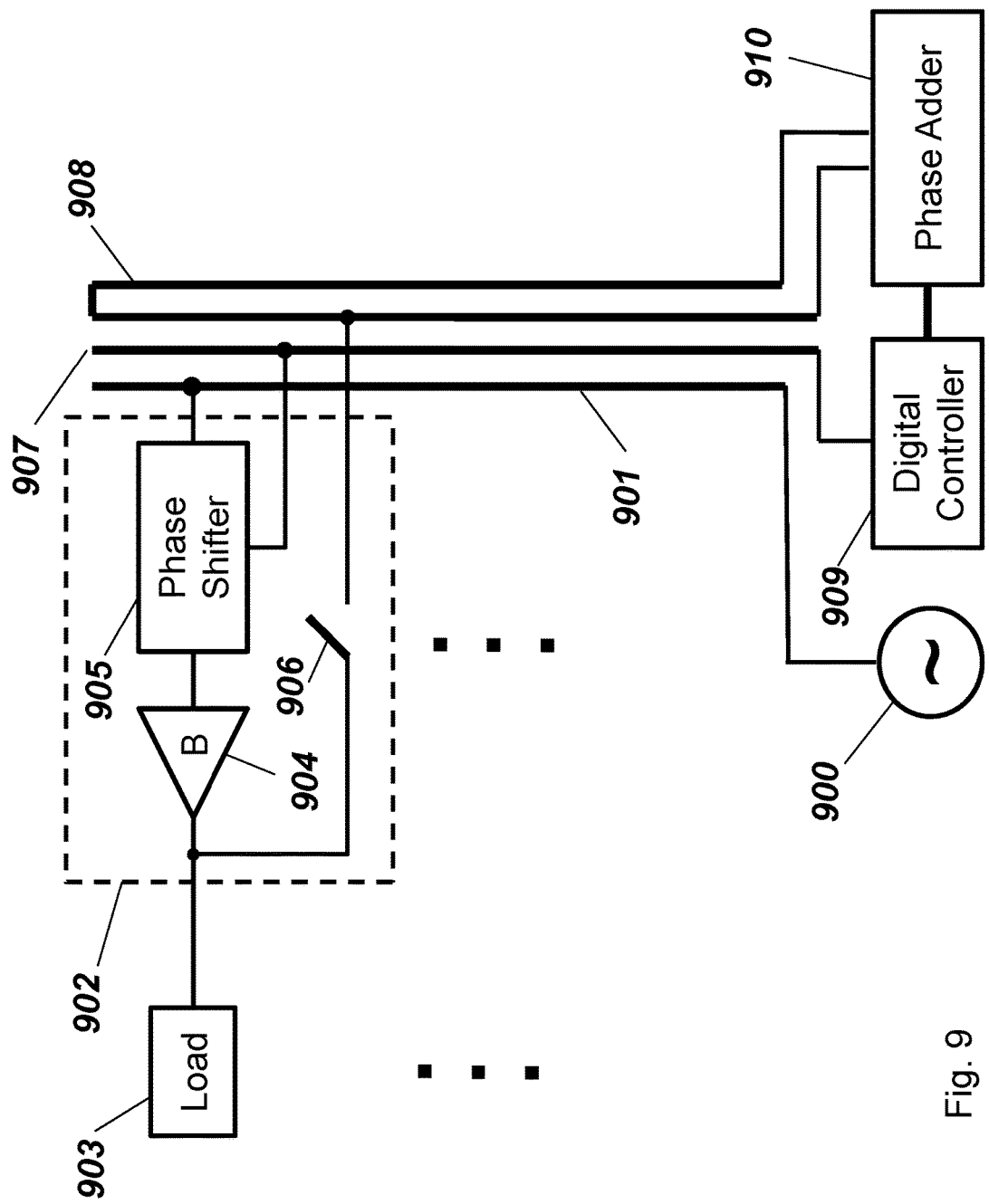
FIG. 9 illustrates a system in which the calibration techniques described herein are applied to distributing a clock signal to VLSI.

FIG. 9 shows a diagram of a possible application of the methods described here to clock distribution in VLSI or on boards. The distribution system consists of a clock generator 900, a serial interconnection 901 (e.g. a transmission line)

and a plurality of Local Clock Generating circuits 902. Only a single Local Clock Generating circuit is shown in FIG. 9 for simplicity but a plurality of circuits 902 are usually connected to the serial interconnection 901 at various points. The Local Clock Generating circuit 902 drives a local Load 903. Each Local Clock Generating circuit 902 from the plurality of circuits 902 drives a different local Load 903. In general, the signals distributed this way to the loads have phases that are significantly different from each other because the system is highly asymmetric in physical and electrical properties. These phase values are usually unpredictable because the exact transmission properties of the serial interconnection 901 are unknown, the exact electrical properties of the circuits 902 are unknown and the exact values of the loads are unknown. Furthermore, the electrical properties of these components vary with operating conditions such as temperature and humidity. The rest of the system in FIG. 9 measures and calibrates the phases of the distributed signals at the loads according to the new methods described earlier.

The Local Clock Generating circuit 902 contains a buffer 904 for driving the load 903 and a Phase Shifter 905 controlled by a central Digital Controller 909 via a digital bus 907. The Digital Controller 909 can set the state of the Phase Shifter 905 such as to shift the phase of the clock signal passing through it by an arbitrary value with sufficient resolution. Such clock signal Phase Shifters with high resolution are common in VLSI circuits, often implemented as simple chains of digital inverters (digital unit delays). The phase shifting controlling logic switches a desired number of inverters in or out of the circuit to vary the total delay through the chain and thus vary the output phase. The same Phase Shifter integrated circuit design could be used for the implementation of the scheme in FIG. 9 for clock distribution over boards. The Local Clock Generating circuit 902 also contains a switch 906 controlled by the Digital Controller 909 via the digital bus 907. The actual control line of the switch 906 is not shown in FIG. 9 for simplicity. The Digital Controller 909 is assumed to have the capability (e.g. via digital addresses) to control independently all Phase Shifters 905 and switches 906 in the system.

The system in FIG. 9 is completed by the sensing serial interconnection 908 and the Phase Adder 910. The serial interconnection 908 is assumed matched with the serial interconnection 901 over the distance circuits 902 are connected. For example, the serial interconnections 908 and 901 are assumed to be identical in structure and in close physical proximity of each other (e.g. two identical transmission lines running in parallel inside the VLSI chip or on the circuit board). The system operates as follows.

First the Digital Controller sets all Phase Shifters 905 to an initial state, such as zero phase shift. Then, the Digital Controller 909 switched on the switch 906 in a single Local Clock Generating circuit 902 considered to be the first Local Clock Generating circuit 902 (all other switches 906 are off). As a result, the output signal of the buffer 904 is injected into the serial interconnection 908 and travels towards the Phase Adder 910 in opposite directions over two paths. The Phase Adder 910 adds the received phases and transmits the result to the Digital Controller 909, which stores the result. Then, the Digital Controller turns off the switch 906 of the first Local Clock Generating circuit 902 and turns on the switch 906 of another Local Clock Generating circuit 902 to be considered the second Local Clock Generating circuit. Once again, the Phase Adder 910 adds the new incoming phases and transmits the result to the Digital Controller. Then the process repeats until the switches 906 of all Local Clock Generating circuits are turned on and the Phase Adder 910 adds the respective incoming phases and transmits all results to the Digital Controller. After this process ends, the Digital Controller calculates the phase shifts at each Local Clock Generating circuit necessary to equalize their output phases and sets the states of the Phase Shifters 905 accordingly.

Other embodiments are within the scope of the following claims.

What is claimed is:

1. A method involving a serial interconnection system having a first node, a second node, a plurality of calibration nodes that are electrically connected in series by the serial interconnection system, and a plurality of connection nodes corresponding to the plurality of serially connected calibration nodes, said plurality of connection nodes electrically connected in series by the serial interconnection system, said method comprising:
   for each calibration node of the plurality of calibration nodes performing a measurement procedure involving:
      injecting a corresponding reference signal into that calibration node of the plurality of calibration nodes; and
      while the corresponding reference signal is being injected into that calibration node of the plurality of calibration nodes, determining a phase summation for that calibration node of the plurality of calibration nodes, said phase summation for that calibration node of the plurality of calibration nodes being a sum of the phases of signals appearing at the first and second nodes;
   from the determined phase summations for the plurality of calibration nodes, computing phase corrections for each calibration node of the plurality of calibration nodes; and
   applying the phase corrections computed for each calibration node of the plurality of calibration nodes to the corresponding plurality of connection nodes.

2. The method of claim 1, further comprising:
   injecting a first reference signal into the first node;
   while the first reference signal is being injected into the first node, determining for the first node a summation of the phases of that injected first reference signal into the first node and a signal appearing at the second node;
   wherein computing phase corrections for each calibration node of the plurality of calibration nodes also employs the determined phase summation for the first node.

3. The method of claim 1, wherein for each calibration node of the plurality of calibration nodes the measurement procedure also involves while the corresponding reference signal is being injected into that calibration node of the plurality of calibration nodes, determining a magnitude product for that calibration node of the plurality of calibration nodes, said magnitude product for that calibration node of the plurality of calibration nodes being a product of the magnitudes of the signals appearing at the first and second nodes, and the method further comprises:
   from the determined magnitude products for the plurality of calibration nodes, computing magnitude corrections for each calibration node of the plurality of calibration nodes; and
   applying the magnitude corrections computed for each calibration node of the plurality of calibration nodes to the corresponding plurality of connection nodes.

4. The method of claim 3, further comprising:
   injecting a first reference signal into the first node;
   while the first reference signal is being injected into the first node, determining for the first node a summation of the phases and a product of the magnitudes of that injected first reference signal and a signal appearing at the second node;

wherein computing phase and magnitude corrections for each calibration node of the plurality of calibration nodes also employs the determined phase summation for the first node and the determined magnitude product for the first node.

5. The method of claim 3, wherein the serial interconnection system also includes an input node, said method further comprising:

injecting a first reference signal into the input node and the first node;

while the first reference signal is being injected into the input node and the first node, determining a summation of the phases and a product of the magnitudes of that injected first reference signal at the input node and a signal appearing at the second node, wherein computing phase and magnitude corrections for each calibration node of the plurality of calibration nodes also employs the determined phase summation and the determined magnitude product for the input node.

6. The method of claim 1, wherein the serial interconnection system comprises a first serial interconnection serially interconnecting the first node, the plurality of connection nodes, and the second node, and wherein the plurality of calibration nodes is the same as the plurality of connection nodes.

7. The method of claim 1, wherein the serial interconnection system comprises a first serial interconnection having a portion thereof serially interconnecting the first node, the plurality of calibration nodes, and the second node and a second serial interconnection having a portion thereof serially interconnecting the plurality of connection nodes, wherein the first serial interconnection and the second serial interconnection are separate.

8. The method of claim 7, wherein the portion of the first serial interconnection that serially interconnects the plurality of calibration nodes and the portion of the second serial interconnection that serially interconnects the plurality of connection nodes are electrically matched.

9. The method of claim 1, wherein the serial interconnection system comprises a first serial interconnection having a portion thereof serially interconnecting the second node and the plurality of calibration nodes, a second serial interconnection having a portion thereof serially interconnecting the first node and the plurality of calibration nodes, and a third serial interconnection having a portion thereof serially interconnecting the plurality of connection nodes.

10. The method of claim 9, wherein the portion of the first serial interconnection that serially interconnects the plurality of calibration nodes, the portion of the second serial interconnection that serially interconnects the plurality of calibration nodes, and the portion of the third serial interconnection that serially interconnects the plurality of connection nodes are electrically matched.

11. The method of claim 1, wherein while performing the measurement procedure for any one of the calibration nodes of the plurality of calibration nodes, applying no other reference signals to any of the other calibration nodes among the plurality of calibration nodes.

12. The method of claim 1, wherein the plurality of connection nodes is the same as the plurality of calibration nodes.

13. The method of claim 1, wherein the corresponding reference signals for the plurality of calibration nodes have the same frequency.

14. The method of claim 1, wherein the serial interconnection system also includes an input node, said method further comprising:

injecting a first reference signal into the input node and the first node;

while the first reference signal is being injected into the input node and the first node, determining a summation of the phases of that injected first reference signal at the input node and a signal appearing at the second node, wherein computing phase corrections for each calibration node of the plurality of calibration nodes also employs the determined phase summation for the input node.

15. The method of claim 14, wherein the serial interconnection system comprises a first serial interconnection having a portion thereof serially interconnecting the first node and the plurality of calibration nodes, and a second serial interconnection having a portion thereof serially interconnecting the input node and the plurality of connection nodes.

16. The method of claim 15, wherein the portion of the first serial interconnection that serially interconnects the first node and the plurality of calibration nodes and the portion of the second serial interconnection that serially interconnects the input node and the plurality of connection nodes are electrically matched.

17. A method involving a serial interconnection system having a first node, a second node, a plurality of calibration nodes that are electrically connected in series by the serial interconnection system, and a plurality of connection nodes corresponding to the plurality of serially connected calibration nodes, said plurality of connection nodes electrically connected in series by the serial interconnection system, said method comprising:

for each calibration node of the plurality of calibration nodes performing a measurement procedure involving:
injecting a corresponding reference signal into that calibration node of the plurality of calibration nodes; and
while the corresponding reference signal is being injected into that calibration node of the plurality of calibration nodes, determining a magnitude product for that calibration node of the plurality of calibration nodes, said magnitude product for that calibration node of the plurality of calibration nodes being a product of the magnitudes of the signals appearing at the first and second nodes;

from the determined magnitude products for the plurality of calibration nodes, computing magnitude corrections for each calibration node of the plurality of calibration nodes; and applying the magnitude corrections computed for each calibration node of the plurality of calibration nodes to the corresponding plurality of connection nodes.

18. The method of claim 17, further comprising:

injecting a first reference signal into the first node;

while the first reference signal is being injected into the first node, determining for the first node a product of the magnitudes of that injected first reference signal into the first node and a signal appearing at the second node;

wherein computing magnitude corrections for each calibration node of the plurality of calibration nodes also employs the determined magnitude product for the first node.

19. The method of claim 17, wherein the serial interconnection system also includes an input node, said method further comprising:
injecting a first reference signal into the input node and the first node;
while the first reference signal is being injected into the input node and the first node, determining for the input node a product of the magnitudes of that injected first reference signal at the input node and a signal appearing at the second node,
wherein computing magnitude corrections for each calibration node of the plurality of calibration nodes also employs the determined magnitude product for the input node.

20. An apparatus comprising:
a serial interconnection system having a first node, a second node, a plurality of calibration nodes that are electrically connected in series by the serial interconnection system, and a plurality of connection nodes corresponding to the plurality of serially connected calibration nodes, said plurality of connection nodes electrically connected in series by the serial interconnection system;
a phase detector electrically connected to the first and second nodes of the serial interconnection system for determining a summation of the phases of signals sensed at the first and second nodes;
a plurality of switchably controlled signal sources, each switchably controlled signal source connected to a different corresponding calibration node of the plurality of calibration nodes; and
a controller system programmed to perform the functions of:
for each calibration node of the plurality of calibration nodes, performing a measurement procedure involving:
causing the switchably controlled signal source for that calibration node of the plurality of calibration nodes to inject a corresponding reference signal into that calibration node of the plurality of calibration nodes; and
while the corresponding reference signal is being injected into that calibration node of the plurality of calibration nodes, causing the phase detector to determine a phase summation for that calibration node of the plurality of calibration nodes, said phase summation for that calibration node of the plurality of calibration nodes being a sum of the phases of signals appearing at the first and second nodes;
from the determined phase summations for the plurality of calibration nodes, computing phase corrections for each calibration node of the plurality of calibration nodes; and
applying the phase corrections computed for each calibration node of the plurality of calibration nodes to the corresponding plurality of connection nodes.

21. The apparatus of claim 20, further comprising:
a switchably controlled first signal source connected to the first node; and
wherein the controller system is further programmed to perform the functions of:
causing the switchably controlled first signal source to inject a first reference signal into the first node;
while the first reference signal is being injected into the first node, causing the phase detector to determine for the first node a summation of the phases of that injected first reference signal and a signal appearing at the second node,
wherein computing phase corrections for each calibration node of the plurality of calibration nodes also employs the determined phase summation for the first node.

22. The apparatus of claim 20, wherein the serial interconnection system comprises a first serial interconnection serially interconnecting the first node, the plurality of connection nodes, and the second node, and wherein the plurality of calibration nodes is the same as the plurality of connection nodes.

23. The apparatus of claim 20, wherein the serial interconnection system comprises a first serial interconnection having a portion thereof serially interconnecting the first node, the plurality of calibration nodes, and the second node and a second serial interconnection having a portion thereof serially interconnecting the plurality of connection nodes, wherein the first serial interconnection and the second serial interconnection are separate.

24. The apparatus of claim 23, wherein the portion of the first serial interconnection that serially interconnects the plurality of calibration nodes and the portion of the second serial interconnection that serially interconnects the plurality of connection nodes are electrically matched.

25. The apparatus of claim 20, wherein the serial interconnection system comprises a first serial interconnection having a portion thereof serially interconnecting the second node and the plurality of calibration nodes, a second serial interconnection having a portion thereof serially interconnecting the second node and the plurality of calibration nodes, and a third serial interconnection having a portion thereof serially interconnecting the plurality of connection nodes.

26. The apparatus of claim 25, wherein the portion of the first serial interconnection that serially interconnects the plurality of calibration nodes, the portion of the second serial interconnection that serially interconnects the plurality of calibration nodes, and the portion of the third serial interconnection that serially interconnects the plurality of connection nodes are electrically matched.

27. The apparatus of claim 20, wherein the controller system is further programmed to cause the switchably controlled signal sources for the plurality of calibration nodes to inject corresponding reference signals into the plurality of calibration nodes only one at a time.

28. The apparatus of claim 20, wherein the corresponding reference signals for the plurality of calibration nodes have the same frequency.

29. An apparatus comprising:
a serial interconnection system having a first node, a second node, a plurality of calibration nodes that are electrically connected in series by the serial interconnection system, and a plurality of connection nodes corresponding to the plurality of serially connected calibration nodes, said plurality of connection nodes also electrically connected in series by the serial interconnection system;
a phase detector electrically connected to the first and second nodes of the serial interconnection system for determining a summation of the phases of signals sensed at the first and second nodes;
a plurality of switches for switchably electrically connecting each connection node among the plurality of connection nodes to a corresponding different calibration node among the plurality of calibration nodes;
a controller system programmed to perform the functions of:
for each calibration node of the plurality of calibration nodes, performing a measurement procedure involving:

causing the switch for that calibration node to inject a corresponding reference signal from the corresponding connection node into that calibration node of the plurality of calibration nodes; and while the corresponding reference signal is being injected into that calibration node of the plurality of calibration nodes, causing the phase detector to determine a phase summation for that calibration node of the plurality of calibration nodes, said phase summation for that calibration node of the plurality of calibration nodes being a sum of the phases of signals appearing at the first and second nodes;

from the measured phase summations for the plurality of calibration nodes, computing phase corrections for each calibration node of the plurality of calibration nodes; and applying the phase corrections computed for each calibration of the plurality of calibration nodes to the corresponding plurality of connection nodes.

30. The apparatus of claim 29, wherein the serial interconnection system also includes an input node, said apparatus further comprising a signal source electrically connected to the input node.

31. The apparatus of claim 30, further comprising a first switch for switchably electrically connecting the input node to the first node, and wherein the controller system is further programmed to perform the functions of:

causing the first switch to inject a signal into the first node from the input node;

while the signal is being injected into the first node from the input node, causing the phase detector to determine for the input node a summation of the phases of that signal injected into the first node from the input node and a signal appearing at the second node, wherein computing phase corrections for each calibration node of the plurality of calibration nodes also employs the determined phase summation for the input node.

32. An apparatus comprising:

a serial interconnection system having a first node, a second node, a plurality of calibration nodes that are electrically connected in series by the serial interconnection system, and a plurality of connection nodes corresponding to the plurality of serially connected calibration nodes, said plurality of connection nodes electrically connected in series by the serial interconnection system;

a magnitude detector electrically connected to the first and second nodes of the serial interconnection system for determining a product of the magnitudes of signals sensed at the first and second nodes;

a plurality of switchably controlled signal sources, each switchably controlled signal source connected to a different corresponding calibration node of the plurality of calibration nodes; and a controller system programmed to perform the functions of:

for each calibration node of the plurality of calibration nodes, performing a measurement procedure involving:

causing the switchably controlled signal source for that calibration node of the plurality of calibration nodes to inject a corresponding reference signal into that calibration node of the plurality of calibration nodes; and while the corresponding reference signal is being injected into that calibration node of the plurality of calibration nodes, causing the magnitude detector to determine a product of the magnitudes of signals appearing at the first and second nodes;

from the determined magnitude products for the plurality of calibration nodes, computing magnitude corrections for each of the plurality of calibration nodes; and applying the magnitude corrections computed for each calibration node of the plurality of calibration nodes to the corresponding plurality of connection nodes.

33. The apparatus of claim 32, further comprising:

a switchably controlled first signal source connected to the first node; and wherein the controller system is further programmed to perform the functions of:

causing the switchably controlled first signal source to inject a first reference signal into the first node;

while the first reference signal is being injected into the first node, causing the magnitude detector to determine for the first node a product of the magnitudes of that injected first reference signal and a signal appearing at the second node, wherein computing magnitude corrections for each calibration node of the plurality of calibration nodes also employs the determined magnitude product for the first node.

34. An apparatus comprising:

a serial interconnection system having a first node, a second node, a plurality of calibration nodes that are electrically connected in series by the serial interconnection system, and a plurality of connection nodes corresponding to the plurality of serially connected calibration nodes, said plurality of connection nodes also electrically connected in series by the serial interconnection system;

a magnitude detector electrically connected to the first and second nodes of the serial interconnection system for determining a product of magnitudes of signals sensed at the first and second nodes;

a plurality of switches for switchably electrically connecting each connection node among the plurality of connection nodes to a corresponding different calibration node among the plurality of calibration nodes;

a controller system programmed to perform the functions of:

for each of the plurality of calibration nodes of the plurality of calibration nodes, performing a measurement procedure involving:

causing the switch for that calibration node of the plurality of calibration nodes to inject a corresponding reference signal from the corresponding connection node into that calibration node of the plurality of calibration nodes; and while the corresponding reference signal is being injected into that calibration node of the plurality of calibration nodes, causing the magnitude detector to determine a product of the magnitudes of signals appearing at the first and second nodes;

from the measured magnitude products for the plurality of calibration nodes, computing magnitude corrections for each of the plurality of calibration nodes; and applying the magnitude corrections computed for each of the plurality of calibration nodes to the corresponding plurality of connection nodes.

35. The apparatus of claim 34, wherein the serial interconnection system also includes an input node, said apparatus further comprising a signal source electrically connected to the input node.

36. The apparatus of claim 34, further comprising a first switch for switchably electrically connecting the input node to the first node, and wherein the controller system is further programmed to perform the functions of:

- causing the first switch to inject a signal into the first node from the input node;
- while the signal is being injected into the first node from the input node, causing the magnitude detector to determine for the input node a product of the magnitudes of that signal injected into the first node from the input node and a signal appearing at the second node,
- wherein computing magnitude corrections for each calibration node of the plurality of calibration nodes also employs the determined magnitude product for the input node.

* * * * *